US007016478B2

(12) United States Patent
Potorny et al.

(10) Patent No.: US 7,016,478 B2
(45) Date of Patent: Mar. 21, 2006

(54) 911 EMERGENCY VOICE/DATA TELECOMMUNICATION NETWORK

(75) Inventors: Martin C. Potorny, Batavia, IL (US); Vladimir P. Sliva, Naperville, IL (US); David A. Jones, Orland Hills, IL (US); Edward J. Kufeldt, Bull Shoals, AR (US)

(73) Assignee: Lucent Technologies Inc., Murray Hill, NJ (US)

( * ) Notice: Subject to any disclaimer, the term of this patent is extended or adjusted under 35 U.S.C. 154(b) by 189 days.

(21) Appl. No.: 10/720,356

(22) Filed: Nov. 24, 2003

(65) Prior Publication Data

US 2005/0111630 A1 May 26, 2005

(51) Int. Cl.
*H04M 11/04* (2006.01)
(52) U.S. Cl. .................. 379/49; 379/45; 455/404.2
(58) Field of Classification Search ............ 379/37–51; 455/404.1, 404.2; 348/14.01, 14.02
See application file for complete search history.

(56) References Cited

U.S. PATENT DOCUMENTS

| 5,365,570 | A | * | 11/1994 | Boubelik ................... 455/565 |
| 5,841,848 | A | | 11/1998 | Dunn |
| 6,256,489 | B1 | | 7/2001 | Lichter et al. |
| 6,327,342 | B1 | * | 12/2001 | Mobley et al. ............... 379/45 |
| 2001/0021646 | A1 | | 9/2001 | Antonucci et al. |
| 2002/0118797 | A1 | * | 8/2002 | Masuda ....................... 379/45 |

OTHER PUBLICATIONS

Mobile Switching Center, Technical Specifications, 1999, Lucent Technologies Inc.
Lucent Technologies and industry leaders demonstrate third-generation mobile applications for public safety sector, Aug. 11, 2003, Lucent Technologies.
Cellphone/Cordless Handsets, Sep. 18, 2003, Wall Street Journal.
Camera phones pass milestone in photo market, Sep. 22, 2003, Wall Street Journal.
Communicating the Benefits of 3G to Public Safety Sector, Oct. 2, 2003, Lucent Technologies, Inc.

* cited by examiner

*Primary Examiner*—Wing Chan

(57) ABSTRACT

Various embodiments of a 911 emergency voice/data telecommunication network are provided. In one embodiment, the telecommunication network includes: a caller device originating a 911 emergency call having a voice portion, and a data portion, a local service interface, a public voice network, a public data network, and an ESN, wherein the ESN determines the appropriate emergency service organization to receive the 911 emergency call and dispatches the voice portion and data portion thereto. In another embodiment, the telecommunication network includes: a BS, MSC, MPC, and PDE. In another embodiment, the 911 emergency call includes a 911 origination service option. In another aspect of the invention, a method for communicating a mobile-originated 911 emergency call to an appropriate PSAP is provided. In still another aspect of the invention, a caller device for originating the 911 emergency call is provided. The caller device includes: a microphone, a camera, and a 911 button.

37 Claims, 4 Drawing Sheets

911 EMERGENCY VOICE/DATA TELECOMMUNICATION NETWORK

BACKGROUND OF INVENTION

The invention generally relates to a 911 emergency voice/data telecommunication network and, more particularly, to providing voice and data from a 911 emergency caller through the network to an appropriate emergency service mobile unit via a 911 dispatch function and will be described with particular reference thereto. However, it is to be appreciated that the invention is also amenable to other applications.

The continuing evolution of user devices for voice and data communications has made it possible for audio and video (e.g., individual still frame photographs, sequences of still frame photographs, and motion video) to be captured and communicated to remote locations via compatible telecommunication infrastructures. These various types of user devices may interface, for example, with one or more public telecommunication infrastructure. For example, a cellular telephone infrastructure, a public switched telephone network (PSTN), a cable television infrastructure, a satellite communication infrastructure (e.g., satellite television, satellite telephone, etc.), and various types of computer networks, including the Internet.

These various infrastructures typically have a gateway to directly route 911 emergency communications to a 911 network or an indirect means of routing 911 emergency communications through the gateway of another infrastructure. However, the user devices, public telecommunications infrastructures, and 911 network have not been adapted to provide end-to-end audio and video from a 911 emergency caller to an appropriate emergency service mobile unit (e.g., police car radio, police officer radio, fire truck radio, fireman radio, ambulance radio, emergency medical personal radio, etc.).

As can be appreciated from the foregoing, there is motivation for adapting these user devices, public telecommunications infrastructures, and the 911 network to facilitate end-to-end audio and video communication from a 911 emergency caller to an appropriate emergency service mobile device.

BRIEF SUMMARY OF INVENTION

In one aspect of the invention, a 911 emergency voice/data telecommunication network is provided. The 911 emergency voice/data telecommunication network includes: a caller device originating a 911 emergency call having a voice portion and a data portion, wherein the caller device captures sound and image information from the vicinity of the caller device and communicates the captured sound and image information in the 911 emergency call, at least part of the captured sound and image information being communicated in the data portion of the 911 emergency call, a local service interface in communication with the caller device and adapted to receive the 911 emergency call and separately route the voice portion and the data portion through the 911 emergency voice/data telecommunication network to an appropriate emergency service organization, a public voice network in communication with the local service interface and adapted to receive the voice portion of the 911 emergency call from the local service interface, a public data network in communication with the local service interface and adapted to receive the data portion of the 911 emergency call from the local service interface, and an emergency services network in communication with the public voice network and the public data network and adapted to receive the voice portion of the 911 emergency call from the public voice network and the data portion of the 911 emergency call from the public data network, wherein the emergency services network determines the appropriate emergency service organization to receive the 911 emergency call, communicates the appropriate emergency service organization for receiving the 911 emergency call to the local service interface via the public voice or other network interface, and dispatches the voice portion and data portion of the 911 emergency call to the appropriate emergency service organization.

In another embodiment, the 911 emergency voice/data telecommunication network includes: a base station adapted to receive a 911 emergency call originated by a mobile station, the 911 emergency call having a voice portion and a data portion, wherein the mobile station captures sound and image information from the vicinity of the caller device and communicates the captured sound and image information in the 911 emergency call, at least part of the captured sound and image information being communicated in the data portion of the 911 emergency call, a mobile switching center in communication with the base station and adapted to receive the 911 emergency call and separately route the voice portion and the data portion through the 911 emergency voice/data telecommunication network to an appropriate emergency service organization, a mobile positioning center in communication with the mobile switching center and adapted to receive a 911 emergency call origination request associated with the 911 emergency call from the mobile switching center, determine an appropriate public safety access point in an emergency services network for receiving the 911 emergency call, and communicate the appropriate public safety access point for receiving the 911 emergency call to the mobile switching center, and a positioning determining entity in communication with the mobile positioning center and the mobile switching center adapted to receive a geographic position request from the mobile positioning center associated with the 911 emergency call and, in response to the geographic position request, initiating a position determining process to determine a location of the mobile station that originated the 911 emergency call.

In another aspect of the invention, a method for communicating a mobile-originated 911 emergency call to an appropriate public safety answering point is provided. The method includes: a) receiving a first origination request message for the 911 emergency call from a mobile station at a mobile switching center via a base station serving the mobile station, the 911 emergency call including sound and image information from the vicinity of the mobile station, b) communicating a second origination request message for the 911 emergency call from the mobile switching center to a mobile positioning center, c) communicating a geographic position request message from the mobile positioning center to a position determining entity, d) determining a location of the mobile station that originated the 911 emergency call at the positioning determining entity, e) communicating the location of the mobile station that originated the 911 emergency call from the positioning determining entity to the mobile positioning center in a geographic position return result message, f) determining the appropriate public safety answering point for receiving the 911 emergency call at the mobile positioning center from the location of the mobile station that originated the 911 emergency call, g) communicating routing information for the appropriate public safety answering point from the mobile positioning center to the mobile switching center in a return result message in response to the second origination request message, and h) separately routing a voice portion and a data portion of the 911 emergency call to the appropriate public safety answering point.

In another aspect of the invention, a caller device for originating a 911 emergency call having a voice portion and a data portion is provided. The caller device includes: a microphone to capture sound information from the vicinity of the caller device, a camera to capture the image information from the vicinity of the caller device, and a 911 button wherein the 911 emergency call is originated after activation of the 911 button or in some subscriber activation sequence or subscriber configurable sequence, wherein the caller device communicates the captured sound and image information in the 911 emergency call, at least part of the captured sound and image information being communicated in the data portion of the 911 emergency call;

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements.

Figure 1:
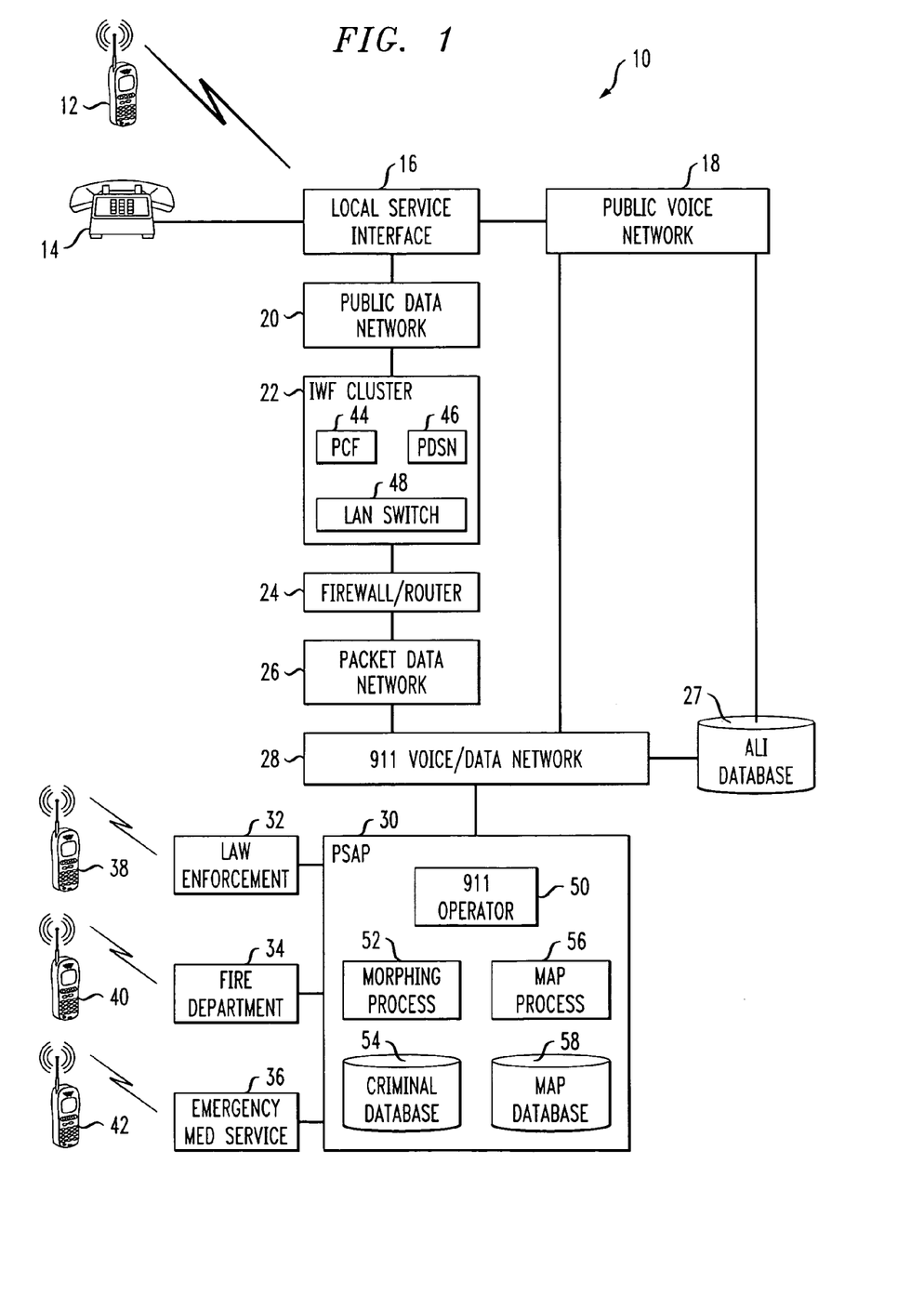
FIG. 1 is a block diagram of an exemplary 911 emergency voice/data telecommunication network providing end-to-end audio and video communication from a 911 emergency caller to an appropriate emergency service mobile device, wherein the caller is using a wireless or landline device.

With reference to FIG. 1, an exemplary 911 emergency voice/data telecommunication network 10 includes a wireless 911 caller device 12, a landline 911 caller device 14, a local service interface 16, a public voice network 18, a public data network 20, an inter-working function (IWF) cluster 22, a firewall/router 24, a packet data network 26, an automatic location identification (ALI) database 27, a 911 voice/data network 28, a public safety answering point (PSAP) 30, a law enforcement base station 32, a fire department base station 34, an emergency medical service (EMS) base station 36, a law enforcement mobile unit 38, a fire department mobile unit 40, and an EMS mobile unit 42. Any one of the wireless 911 caller device 12 and landline 911 caller device 14 is optional. Any two of the law enforcement base station 32, fire department base station 34, and EMS base station 36 are optional. Likewise, the law enforcement mobile unit 38, fire department mobile unit 40, and EMS mobile unit 42 are optional. Moreover, other emergency response organizations, including military and non-military organizations may be dispatched by the PSAP 30.

The IWF cluster 22 includes a packet control function (PCF) 44, a packet data serving node (PDSN) 46, and a LAN switch 48. The PSAP 30 includes a 911 operator 50, a morphing process 52, a criminal database 54, a map process 56, and a map database 58. The combination of the morphing process 52 and criminal database 54 implements technology known in the art and is optional. Likewise, the combination of the map process 56, and map database 58 implements technology known in the art and is optional.

A caller may use the wireless 911 caller device 12 or the landline 911 caller device 14 to place a 911 emergency call to a local emergency response organization (e.g., law enforcement, fire department, EMS, military organization, etc.). The 911 emergency call may be placed from the wireless 911 caller device 12 or the landline 911 caller device 14 by pressing "911" on the keypad, as in current telephone handsets. In some handsets, a "send" button or similar control is operated after pressing "911" to actually place the call. In another embodiment, the wireless 911 caller device 12 and/or landline 911 caller device 14 may also be equipped with a "hot" 911 button and, preferably, a safety mechanism. If the 911 button is implemented without the safety mechanism, operating the 911 button places the 911 emergency call. If both the 911 button and safety mechanism are implemented, they are operated in a predetermined sequence to place the 911 emergency call. The safety mechanism may be a mechanical interlock, an electrical interlock, a software interlock, or any combination thereof. In one embodiment, the safety mechanism may be a "send" button or similar control.

The wireless 911 caller device 12 and landline 911 caller device 14 is also equipped with audio components to capture sounds from the vicinity of the respective device and communication components to communicate the captured sounds to the network 10 in data packets. The audio components include a microphone to capture sounds from the vicinity of the device. A separate microphone from the standard microphone for normal voice communication is preferred. However, the standard microphone may be implemented in a speaker mode to capture sounds from the vicinity. The audio capture feature provides information associated with the emergency that is potentially useful to the emergency response organization and may provide evidence from a crime scene that is potentially useful in arresting, indicting, and prosecuting suspects. The vital significance of time stamping such data is inherently recognized.

Mobile unit activation is envisioned to be possible by subscribers with a few different embodiments. For example, ordinary 911 dialing and using a fast activation mechanism or a fast activation mechanism with an activation safety mechanism that prevents inadvertent or inappropriate activation. Also, via subscriber determinable mobile unit configuration in association with the aforementioned exemplary embodiments.

The wireless 911 caller device 12 and landline 911 caller device 14 may also be equipped with imaging components to capture images from the vicinity of the respective device and communication components to communicate the captured images to the network 10 in data packets. The imaging components include a camera to capture still frame images (i.e., photographs), a sequence of still frame images, and/or motion video of the vicinity of the device. The camera may be a peripheral device in communication with the caller device or integrated within the caller device. The image capture feature also provides information associated with the emergency that is potentially useful to the emergency response organization and may also provide evidence from a crime scene that is potentially useful in arresting, indicting, and prosecuting suspects. The vital significance of time stamping such data is inherently recognized.

The wireless 911 caller device 12 may be, for example, any type of wireless caller device, including, for example, a cordless telephone, mobile station (MS), personal communication system (PCS), personal digital assistant (PDA), any type of wireless computing device, or any type of wireless peripheral computing device. The wireless caller device may implement any suitable wireless communication protocol including, for example, IEEE 802.11b (e.g., wireless fidelity (WiFi)), 802.16a (e.g., WiFi Max, Wider Fi), Bluetooth, CDMA, TDMA, GSM, etc. The landline 911 caller device 14 may be, for example, any type of landline telephone, any type of wired computing device, or any type of wired peripheral computing device. The wireless 911 caller device 12 and landline 911 caller device 14 are in operative communication with the local service interface 16 and use control signals, voice signals, and data signals to originate the 911 emergency with the local service interface 16. The control signals may include, for example, signals to specify high priority for the 911 emergency call from its origination and to identify whether the caller device has implemented audio capture or audio and video capture. The captured audio may be provided via the voice signals (i.e., voice channel) or the data signals (i.e., data channel). In one embodiment, the wireless 911 caller device 12 and landline 911 caller device 14 add a timestamp to the sound and image information in the 911 emergency call representing the date and time at which the respective sound and/or image is captured. Time stamping the sound and image information is particularly when it is used, for example, as evidence in support of arresting, indicting, and prosecuting suspects.

The local service interface 16 is in communication with the public voice network 18 and initially sets up a voice channel for the 911 emergency call to the 911 voice/data network 28 through the public voice network 18. The local service interface 16 may include any combination of one or more of various types of local communication services, including, for example, local landline telephone service, cellular telephone service, satellite telephone service, satellite (television) service, and cable (television (TV)) service. The public voice network 18 may implement any combination of one or more of various types of packet switching networks associated with telephone, radio, and infra-red communication technologies. The 911 voice/data network 28 is an interface between the various public networks and a private emergency services network (ESN) which is typically administered by a local government organization. When the 911 voice/data network 28 receives a 911 emergency call it knows the calling party and retrieves position and location information associated with the calling party from the ALI database 27. Using the position and location information, the 911 voice/data network 28 extends the voice channel for the 911 emergency call to the PSAP 30 responsible for that geographic area.

Either the PSAP 30 or the 911 voice/data network 28 communicates a static IP address associated with the PSAP 30 to the local service interface 16 for transmission of captured data from the caller device. The local service interface 16 returns the IP address to the caller device in response to the 911 emergency call origination. The local service interface 16 also sets up a data channel for the 911 emergency call to the 911 voice/data network 28 through the public data network 20, IWF cluster 22, firewall/router 24, and packet data network 26. The public data network 20, IWF cluster 22, firewall/router 24, and packet data network 26 may implement any combination of one or more of various types of packet switching networks associated with telephone, radio, and computer networking technologies.

With both the voice and data channels set up, the wireless 911 caller device 12 or landline 911 caller device 14 transmits voice signals over the voice channel and data signals over the data channel to the 911 operator 50 associated with the PSAP 30. The 911 operator 50 may communicate with the 911 emergency caller via the voice channel in the same manner as current 911 calls. Additionally, the 911 operator 50 receives captured audio via the voice or data channel and one or more captured images via the data channel. These separate voice and data channels may be merged. The captured information received via the data channel is received at the IP address associated with the PSAP 30. The 911 operator 50 determines to which emergency service organization the 911 emergency call should be routed and dispatches the call, including captured audio and images, to the appropriate law enforcement station 32, fire department station 34, and/or EMS station 36. Moreover, other emergency response organizations, including military and non-military organizations may be dispatched by the PSAP 30. Each emergency response organization may dispatch the 911 emergency call, including captured audio and images, to one or more associated mobile units 38, 40, 42. The mobile units may be vehicular or human-portable. In one embodiment, the 911 operator 50 may also dispatch the 911 emergency call directly to mobile units associated with one or more of the emergency response organizations. Geo-location technologies can coordinate subscriber 911 activation, with certain 911 services, such as deployed police forces.

The PSAP 30 may use the morphing process 52 and criminal database 54 to match suspects in a given captured image to images of criminals in the criminal database. Information about matches between criminals and suspects may be retrieved from the database and added to the dispatched 911 emergency call by the PSAP either in real-time or as a post-processed function. Moreover, the PSAP 30 may use the position and location information associated with the caller device in conjunction with the map process 56 and map database 58 to construct a map identifying the location of the caller device along with potentially the location of the dispatched mobile units 38, 40, 42 as determined to be in the proximate geographic vicinity. The map may also be added to the dispatched 911 emergency call by the PSAP 30.

User interfaces associated with the 911 operator 50, dispatched emergency service stations 32, 34, 36, and dispatched mobile units 38, 40, 42 may communicate the captured audio, one or more captured images, information from the criminal database matching criminals to suspects in a captured image, and the map showing the location of the caller device to various corresponding 911 services.

Figure 2:
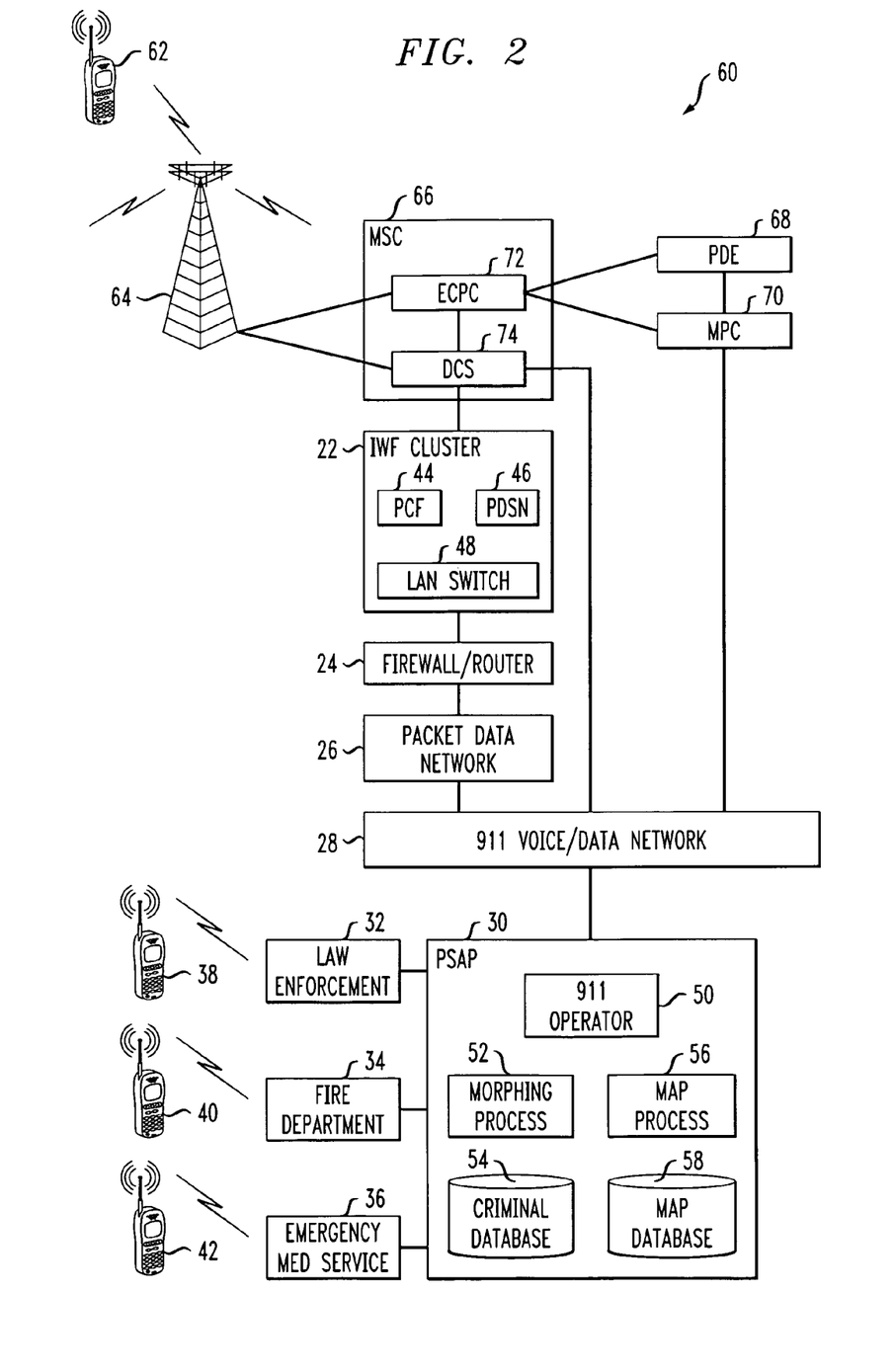
FIG. 2 is a block diagram of another exemplary 911 emergency voice/data telecommunication network providing end-to-end audio and video communication from a 911 emergency caller to an appropriate emergency service mobile device, wherein the caller is using a mobile station (MS).

With reference to FIG. 2, another exemplary 911 emergency voice/data telecommunication network 60 includes a mobile station (MS) 62, a base station (BS) 64, a mobile switching center (MSC) 66, a position determining entity (PDE) 68, a mobile positioning center (MPC) 70, the IWF cluster 22, firewall/router 24, packet data network 26, 911 voice/data network 28, PSAP 30, law enforcement base station 32, fire department base station 34, EMS base station 36, law enforcement mobile unit 38, fire department mobile unit 40, and EMS mobile unit 42. Like for the network of FIG. 1, any two of the law enforcement base station 32, fire department base station 34, and EMS base station 36 are optional and the law enforcement mobile unit 38, fire department mobile unit 40, and EMS mobile unit 42 are optional. Likewise, other emergency response organizations, including military and non-military organizations may be dispatched by the PSAP 30. The IWF cluster 22 includes the same components and operates as described above in reference to FIG. 1.

A caller may use the MS 62 to place a 911 emergency call to a local emergency response organization (e.g., law enforcement, fire department, EMS, military organization). The MS 62 may be any type of cellular telephone-type device, for example, a cellular telephone or PDA-like devices. The MS 62 includes the various features and operates in the same manner as described above for the wireless 911 caller device 12 (FIG. 1). The MS may implement any suitable wireless communication protocol including, for example, IEEE 802.11b (e.g., wireless fidelity (WiFi)), 802.16a (e.g., WiFi Max, Wider Fi), Bluetooth, etc., in addition to CDMA, TDMA, and/or GSM for cellular telephone communications. Communications interfaces like WiFi and Bluetooth provide the MS with a communication means to the various communications networks shown in FIG. 1, rather than the wireless network depicted in FIG. 2. The MS 62 is within operative range and in operative communication with the BS 64. The MS 62 uses control signals, for example, a 911 emergency voice/data service option, to specify high priority for the 911 emergency call from its origination at the BS 64. While only one BS 64 is shown, the network includes a plurality of BSs as is known in cellular telephone technology to provide expanded geographic coverage. Each BS defines a geographic service coverage area. Each MS within a given cell is in operative communication with the corresponding BS. In one embodiment, the mobile station 62 adds a timestamp to the sound and image information in the 911 emergency call representing the date and time at which the respective sound and/or image is captured.

The BS 64 is in communication with the MSC 66 and forwards the control signals for call setup to the ECPC 72 and the voice and data signals to the DCS 74. The MSC 66 recognizes from the call origination control signals that a 911 emergency call was placed and communicates the call origination to the MPC 70. The MPC 70 communicates with the PDE 68 to initiate a position determining process to determine a location for the MS 62 within the cell associated with the serving MSC 66 and serving BS 64. The PDE 68 communicates back and forth with the MS 62 in order to determine the location of the MS 62. In one embodiment, the MS 62 is equipped with a GPS receiver and in communication with sufficient GPS satellites to provide its location directly to the PDE 68 based on GPS data. In another embodiment, the PDE 68 determines the location of the MS 62 by comparing triangulated signal strength between multiple BSs and the MS 62. In still another embodiment, other algorithms in the PDE 68 combine GPS data and BS signal strength data to determine the location of the MS 62. Once geo-positioning is determined, by whatever means, the PDE 68 or possibly MS-based mechanisms communicate the location of the MS 62 to the MPC 70. The MPC 70 determines which PSAP 30 handles 911 emergency calls for the geographic area in which the MS 62 is located. The MPC 70 identifies the serving PSAP 30 to the ECPC 72 and the DCS 74 initially sets up a voice channel for the 911 emergency call to the PSAP 30 through the 911 voice/data network 28.

Either the serving PSAP 30 or the 911 voice/data network 28 communicates a static IP address associated with the serving PSAP 30 to the MPC 70 for transmission of captured data from the caller device. The MPC 70, in turn, returns the IP address to the caller device through the ECPC 72 in response to the 911 emergency call origination. The DCS 74 also sets up a data channel for the 911 emergency call to the 911 voice/data network 28 through the IWF cluster 22, firewall/router 24, and packet data network 26.

With both the voice and data channels set up, the MS 62 transmits voice signals over the voice channel and data signals over the data channel to the 911 operator 50 associated with the PSAP 30. The voice and data channels are again intelligently merged for dispatch functions. The 911 operator 50, law enforcement station 32, fire department station 34, EMS station 36, law enforcement mobile unit 38, fire department mobile unit 40, and EMS mobile unit 42 operate in the same manner as described above in reference to FIG. 1. Likewise, the PSAP 30 includes the same features and operates in the same manner as described above in reference to FIG. 1 and other emergency response organizations, including military and non-military organizations may be dispatched by the PSAP 30.

Figure 3:
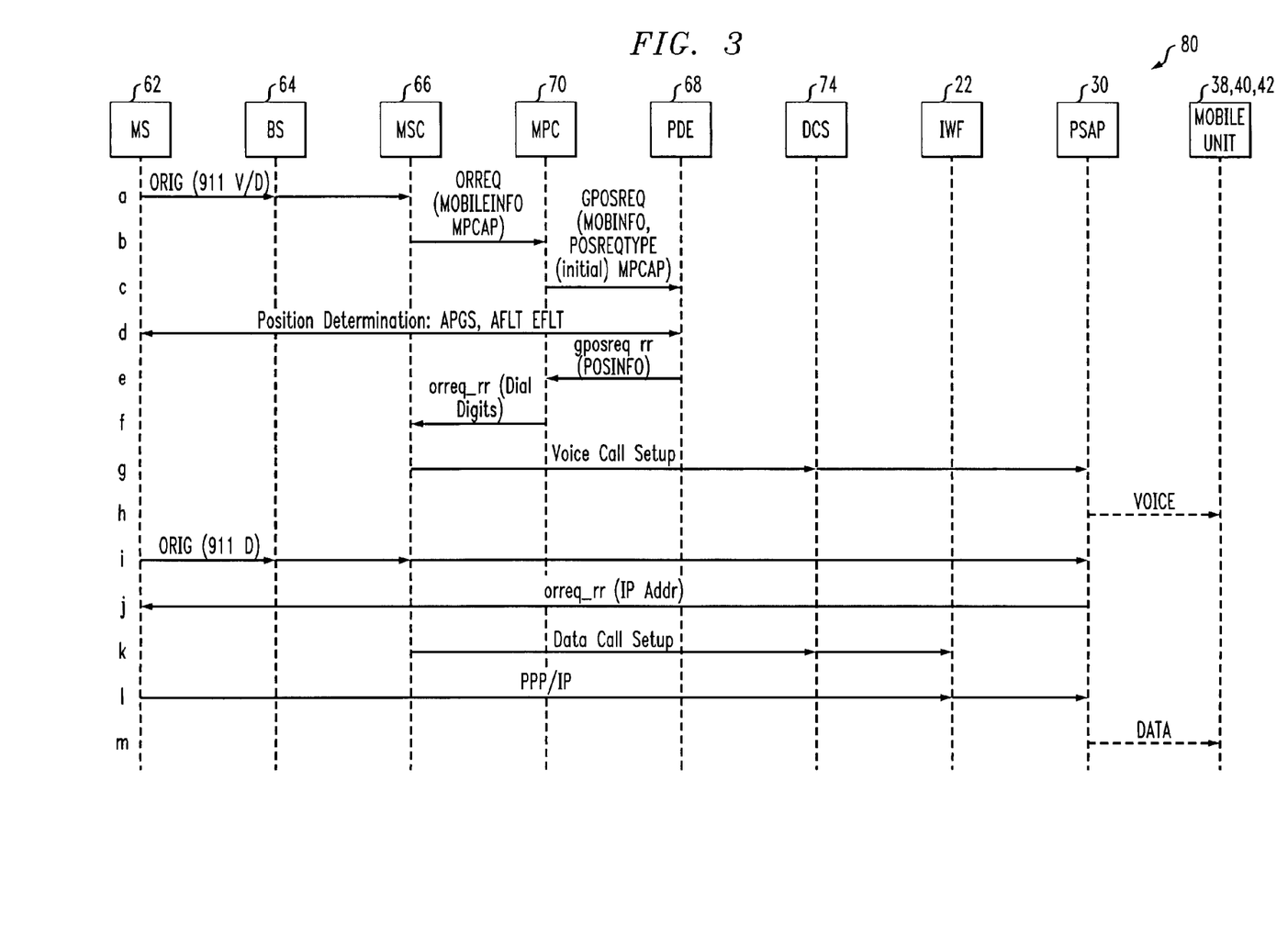
FIG. 3 is a call flow diagram for a mobile-originated 911 emergency call having audio and video components.

With reference to FIG. 3, a mobile-originated 911 emergency call scenario 80 through the 911 emergency voice/data telecommunication network 60 (FIG. 2) is depicted in a call flow diagram. This scenario reflects how a typical wireless network processes the 911 emergency call through the appropriate PSAP 30 to an appropriate emergency service mobile unit 38, 40, 42. Other types of 911 emergency voice/data telecommunication networks, such as the network 10 shown in FIG. 1, may process 911 emergency calls in a similar manner. The MS 62, BS 64, MSC 66, MPC 70, PDE 68, DCS 74, IWF 22, PSAP 30, and emergency service mobile unit 38, 40, 42 described above with reference to FIG. 2 are depicted across the top of the call flow diagram to identify their involvement at certain stages of the processing.

At line a, the originating MS 62 initiates a 911 emergency call by submitting an origination (ORIG) request message for a 911 emergency voice/data call to the MSC 66 through the BS 64. The ORIG request message includes a 911 emergency voice/data service option (i.e., 911 V/D) that is recognized by the BS 64 and MSC 66 and ensures the call is handled in higher priority than other types of calls at both the BS 64 and MSC 66. The MSC 66 sends an origination (ORREQ) request message with MOBILEINFO and mobile positioning capabilities (MPCAP) parameters to the MPC 70 (line b). The ORREQ request message provides the MPC 70 with general MS 62 location information by identifying the serving MSC 66 and serving BS 64. Next, at line c, the MPC 70 sends a geographic position (GPOSREQ) request message to the PDE 68 to initiate a position determining process to determine a more precise location for the MS 62. The GPOSREQ return result message may include MOBINFO, POSREQTYPE, and MPCAP parameters. The PDE 68 and MS 62 exchange a series of messages through the MSC 66 as part of the position determining process (line d). Various parameters, such as assisted global positioning system (AGPS), advanced forward link trilateration (AFLT), and enhanced forward link trilateration (EFLT), are exchanged between the PDE 68 and MS 62 during the position determining process.

At line e, once the location of the MS 62 is determined, the PDE 68 sends a gposreq return result message with the MS position represented in a POSINFO parameter to the MPC 70. Based on the more precise location, the MPC 70 can now determine where to route this particular 911 emergency call. The MPC 70 uses a database reflecting geographic coverage areas of PSAPs and matches the location of the MS 62 to an appropriate PSAP 30. The MPC 70 sends an orreq return result message to the MSC 66 with the Dialed Digits associated with the appropriate PSAP 30 (line f). This tells the MSC 66 where to route the 911 emergency call. At line g, the MSC 66 sets up a voice channel for the 911 emergency call to the appropriate PSAP 30 through the DCS 74. The PSAP 30 determines where to dispatch the 911 emergency call and routes the voice portion of the call to an appropriate emergency service mobile unit 38, 40, 42 via a 911 dispatch function (line h).

At line i, the originating MS 62 submits an ORIG request message for a data portion of the 911 emergency voice/data call to the appropriate PSAP 30 through the BS 64 and MSC 66. The ORIG request message includes a 911 emergency voice/data service option (i.e., 911 D) that is recognized by the BS 64 and MSC 66 and ensures the data portion of the call is handled in higher priority than other types of data traffic at both the BS 64 and MSC 66. Voice and data portions are intelligently merged. The PSAP 30 sends an orreq return result message to the MS 62 with a static IP address for transmission of the data portion of the 911 emergency call (line j). At line k, the MSC 66 sets up a data channel for the 911 emergency call to the appropriate PSAP 30 through the DCS 74 and IWF 22. The MS 62 then begins transmitting captured sounds and images from the vicinity of the MS in packet data form to the PSAP 30 using PPP/IP protocol (line 1). At line m, the PSAP 30 routes the data portion of the call to the dispatched emergency service mobile unit 38, 40, 42.

Alternatives to the above could include the case where knowing which primary cell the mobile is communicating with would be good enough to determine the appropriate PSAP. Then the steps b) through f) above that determine the exact caller's location could be done in parallel with the rest of the call setup or afterwards. Also, the process is not necessarily limited to having the second origination for the data portion of the call, since conceptually, the MSC could handle the data setup transparently to the mobile and just let the mobile know when it can start to send the data.

Figure 4:
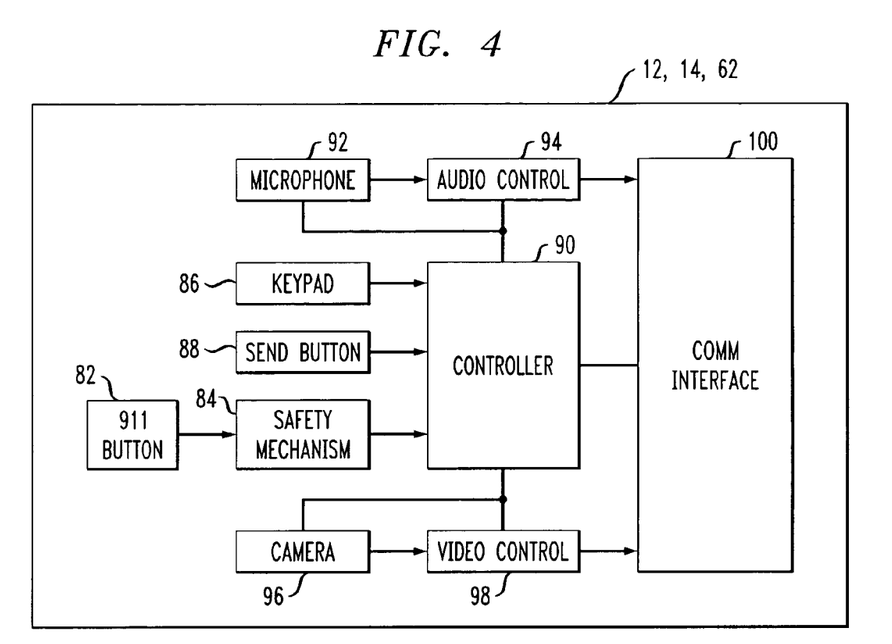
FIG. 4 is a block diagram of an exemplary device used by the 911 emergency caller in conjunction with FIGS. 1–3.

With reference to FIG. 4, an exemplary device used by a 911 emergency caller (e.g., wireless 911 caller device 12 (FIG. 1), landline 911 caller device 14 (FIG. 1), MS 62 (FIG. 2)) includes a 911 button 82, a safety mechanism 84, a keypad 86, a send button 88, a controller 90, a microphone 92, an audio control 94, a camera 96, a video control 98, and a communication interface 100. The combination of the 911 button 82 and safety mechanism 84 are optional. Likewise, the combination of the camera 96 and video control 98 are optional. The device 12, 14, 62 generally operates in the same manner as described above for wireless 911 caller device 12 (FIG. 1), landline 911 caller device 14 (FIG. 1), and MS 62 (FIG. 2).

The 911 button 82 is in communication with the controller 90 through the safety mechanism 84. When the 911 button 82 is pressed and the safety mechanism 84 is operated in appropriate sequence the controller 90 initiates a 911 emergency call. The keypad 86 and send button 88 are also integrated with the controller 90. When "911" is entered using the keypad 86 and the send button 88 is operated in appropriate sequence the controller 90 also initiates a 911 emergency call.

When a 911 emergency call is initiated, the controller 90 controls transmission of the appropriate control signals, including a 911 service option, to the local service interface 16 (FIG. 1) or the BS 64 (FIG. 2) via the communication interface 100 to set up voice and data channels to the ESN. The controller 90 also controls the microphone 92, audio control 94, camera 96, and video control 98 to initiate capturing sounds and images from the vicinity of the caller device 12, 14, 62. The captured audio and video data is also transmitted to the local service interface 16 (FIG. 1) or the BS 64 (FIG. 2) via the communication interface 100 for routing to the ESN via the data channel. In one embodiment, the controller 90 adds a timestamp to the sound and image information in the 911 emergency call representing the date and time at which the respective sound and/or image is captured.

Figure 5:
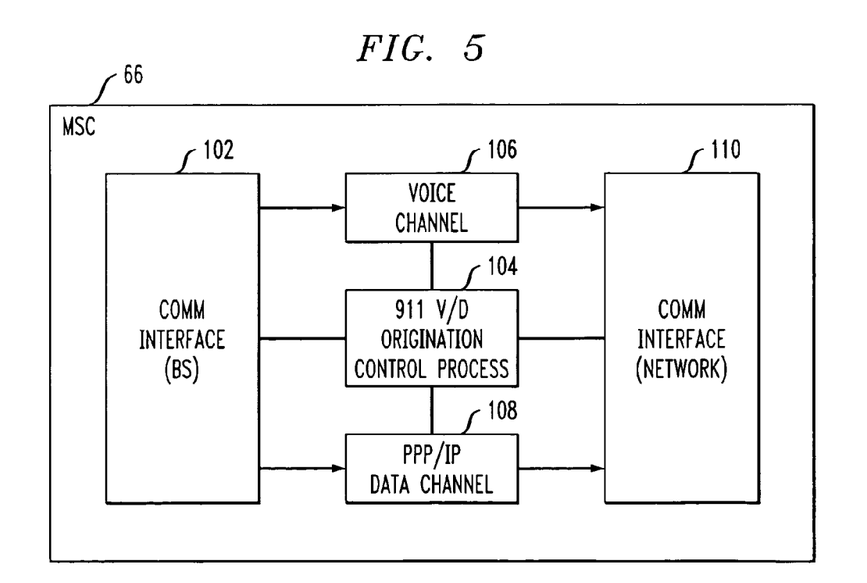
FIG. 5 is a block diagram of an exemplary mobile switching center (MSC) in conjunction with FIGS. 2 and 3.

With reference to FIG. 5, an exemplary MSC 66 includes a communication interface (with the BS) 102, a call processing control process covering 911 voice/data originations 104, a voice channel 106, a PPP/IP data channel 108, and a communication interface (network) 110. The MSC 66 generally operates in the same manner as described above in reference to FIG. 2.

The communication interface (BS) 102 receives call originations from a BS 64 (FIG. 2), including 911 emergency calls. When a call origination with a 911 emergency voice/data service option is received, the 911 voice/data origination control process 104 receives the call origination from the communication interface (BS) 102 and controls setup of the call through the wireless network (or applicable serving telecommunications or Internet interface network) to the ESN via the communication interface (network) 110. The 911 voice/data origination control process 104 also controls voice and PPP/IP data channels 106, 108 through the MSC 66 and switches the voice portion of the 911 emergency call through an appropriate voice channel 106 and the data portion of the 911 emergency call through an appropriate PPP/IP data channel 108 to a PSAP 30 (FIG. 2) via the communication interface (network) 110.

In summary, the caller device (e.g., wireless 911 caller device 12 (FIG. 1), landline 911 caller device 14 (FIG. 1), MS 62 (FIG. 2)) may use a "hot" button to create and transmit an assailant's photograph, crime scene voice, and/or other evidence to law enforcement in a real-time voice and data connection. The caller device or other components within the associated communication networks may utilize global positioning system technology to determine a location of the assault and ensure the 911 emergency caller is connected to an appropriate law enforcement station or mobile unit.

The assailant photo/voice may be transmitted from MSs, including mobile PDA devices using data transmission protocols. The visual photo data is envisioned to be extendable from photo to video, or more minimally a series of photos. The 911 emergency service option for mobile originations ensures that the appropriate resources are assigned to handle the 911 emergency call with high priority. The IP addressing acknowledgement may inform the MS of static (rather than dynamic) IP addressing that may subsequently be used for the IP data connection to the appropriate PSAP in response to the 911 emergency call origination.

The PSAP may compare the assailant photo/voice to an existing criminal database to identify suspects using morphological techniques from records in the criminal database. The handset software and safety mechanism may be operated in conjunction with activation of the "hot" button to originate a 911 emergency call and/or subscriber MS configuration. The 911 emergency voice/data telecommunication network include various network fabric switching platforms and integrates public communication networks with emergency service networks, including 911 law enforcement dispatch platforms.

Field-deployed interface equipment of law enforcement personnel may be capable of voice and data communications associated with 911 emergency calls, including receiving and displaying captured sounds and images from the vicinity of the caller device. This includes mobile vehicular equipment and mobile non-vehicular equipment used by law enforcement. The caller device may integrate wireless network devices, such as MSs and PDAs with other types of networks utilizing other technologies (e.g., WiFi/Max, Bluetooth, infra-red, etc.) to affect emergency service network interfaces via, for example, cable, DSL, or through any such intervening consumer computing and telecommunications technology, including the landline telephone infrastructure.

The 911 emergency voice/data telecommunication network provides enhanced wireless subscriber personal security and improves law enforcement's ability to identify and apprehend assailants and gather evidence from a crime scene. This may be accomplished by providing a MS/PDA, etc. with a trigger activation "hot" button, possibly activated only after release of a mechanism (hardware or software) which "releases" the "hot" button for 911 dialing and scene/assailant photo/voice call routing. After activating the "hot" button, the wireless subscriber device begins transmitting data from the crime scene, potentially including images of the assailant, and automatically originates a 911 emergency call. The origination message may include a service option that would guarantee the right resources pertaining to the telecommunications infrastructure, E911 dispatch, and/or various law enforcement officer equipment resources (or even consumer telecommunications and computing technologies) in order to obtain high priority processing. GPS information may be encapsulated and routed to determine the location of the MS/PDA. Triangulation algorithms may be used in place of or to supplement the GPS information in determining the MS/PDA location.

The network switching platforms and network architecture provides routing of the 911 emergency call to law enforcement dispatch-related platforms. These dispatch platforms inform the handset device of a statically-assigned IP address and associated with the nearest law enforcement dispatch control facility in order to facilitate the hosting of the data portion of the 911 emergency call/session. The combined and routed call elements result in receipt of the 911 emergency call by software applications in 911 emergency dispatch hardware platforms with content encapsulated in a standardized format, which may visually display the victim location via integration with mapping applications software. The encapsulated scene/assailant photo/voice data may be used to compare the photo against existing criminal record databases, and perform visual morphological matching/identification of suspects against potential/known assailants and/or to gather information from the crime scene and/or gather evidence for future judicial uses (e.g., evidence for criminal prosecution).

The captured data, processed as described above, may be routed to field-deployed law enforcement officer interface equipment. A vehicular laptop computer, for example, may include 911 emergency application software used by law enforcement officers to acknowledge receipt of a 911 emergency call. Typically, an "alarm" sounds to obtain an officer's attention, upon acknowledgement the equipment displays information to identify the location of the victim, a map based on location intelligence, and the assailant photo/voice from the vicinity of the victim, and in real-time or subsequently may provide the results of the aforementioned existing criminal photo database morphology match with related assailant background information.

Officers not in the vicinity of the vehicular laptop computer's alarm mechanism may have the vehicular equipment integrated with non-vehicular wireless devices also potentially possessing assailant display capability or otherwise affect notification of the non-vehicular law enforcement officer. Originating the photo may also trigger a 911 emergency voice connection for the 911 dispatch center/operator to continue to gather audio information from the scene until disconnected by the 911 dispatch center/operator. Data encapsulated elements (e.g., digitized assailant photo/voice and geo-location coordinates) are intrinsic in the 911 emergency voice/data telecommunication network. The 911 dispatch is provided with an improved ability for assailant identification (or visual crime scene information) and location.

Wireless subscribers are provided value-added personal security by the 911 emergency voice/data telecommunication network. Law enforcement may be able to better identify and locate suspects and collect additional crime scene evidence, as well as benefiting from more efficient dispatching and apprehension of suspects. The 911 emergency call origination service option ensures obtaining the resources with high priority as is required for 911 emergency calls when the origination message arrives at the BS, as well as minimal overhead, and minimal messaging from call processing. Origination message receipt via other technologies (e.g., WiFi/Max, Bluetooth, infra-red, etc.) may also be provided. The MS/PDA devices, etc. may integrate utilizing other technologies (e.g., WiFi/Max, Bluetooth, infra-red, etc.) to affect 911 system interface, via cable, DSL, or through any such intervening consumer computing and telecommunications technologies, including landline telephone telecommunications infrastructure to enhance the ESN with data/voice transmissions in a 911 emergency call.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof. For example, the foregoing may be implemented in conjunction with enhanced 911 (E911) networks and equipment as well as regular 911 networks and equipment.

The invention claimed is:

1. A 911 emergency voice/data telecommunication network, including: a caller device originating a 911 emergency call having a voice portion and a data portion, wherein the caller device captures sound and image information from the vicinity of the caller device and communicates the captured sound and image information in the 911 emergency call, at least part of the captured sound and image information being communicated in the data portion of the 911 emergency call;

a local service interface in communication with the caller device and adapted to receive the 911 emergency call and separately route the voice portion and the data portion through the 911 emergency voice/data telecommunication network to an appropriate emergency service organization;

a public voice network in communication with the local service interface and adapted to receive the voice portion of the 911 emergency call from the local service interface;

a public data network in communication with the local service interface and adapted to receive the data portion of the 911 emergency call from the local service interface; and an emergency services network in communication with the public voice network and the public data network and adapted to receive the voice portion of the 911 emergency call from the public voice network and the data portion of the 911 emergency call from the public data network, wherein the emergency services network determines the appropriate emergency service organization to receive the 911 emergency call, communicates the appropriate emergency service organization for receiving the 911 emergency call to the local service interface via at least one of the public voice network and public data network, and dispatches the voice portion and data portion of the 911 emergency call to the appropriate emergency service organization.

2. The 911 emergency voice/data telecommunication network as set forth in claim 1, the caller device including:
a microphone to capture the sound information from the vicinity of the caller device.

3. The 911 emergency voice/data telecommunication network as set forth in claim 2 wherein the captured sound information is communicated in the data portion of the 911 emergency call.

4. The 911 emergency voice/data telecommunication network as set forth in claim 1, the caller device including:
a camera to capture the image information from the vicinity of the caller device.

5. The 911 emergency voice/data telecommunication network as set forth in claim 4 wherein the captured image information includes at least one of a still frame image, a sequence of still frame images, or motion video.

6. The 911 emergency voice/data telecommunication network as set forth in claim 5 wherein the captured image information is communicated in the data portion of the 911 emergency call.

7. The 911 emergency voice/data telecommunication network as set forth in claim 1, the caller device including:
a 911 button wherein the 911 emergency call is originated after activation of the 911 button.

8. The 911 emergency voice/data telecommunication network as set forth in claim 7, the caller device further including:
a safety mechanism in operative communication with the 911 button wherein the 911 emergency call is originated after operation of the safety mechanism in a predetermined relation to activation of the 911 button.

9. The 911 emergency voice/data telecommunication network as set forth in claim 1 wherein the 911 emergency call is originated by subscriber MS configuration.

10. The 911 emergency voice/data telecommunication network as set forth in claim 1 wherein origination of the 911 emergency call includes communication of an origination request message specifying a 911 emergency call service option from the caller device to the local service interface.

11. The 911 emergency voice/data telecommunication network as set forth in claim 10 wherein the local service interface responds to the 911 emergency call service option by allocating resources to the 911 emergency call with priority over non-emergency calls.

12. The 911 emergency voice/data telecommunication network as set forth in claim 1 wherein the caller device adds a timestamp to the captured sound and image information communicated in the 911 emergency call.

13. The 911 emergency voice/data telecommunication network as set forth in claim 1 wherein the local service interface includes at least one of a local landline telephone service, a cellular telephone service, a satellite telephone service, a satellite service, a cable service, and an Internet service.

14. The 911 emergency voice/data telecommunication network as set forth in claim 1, the emergency services network including:
a 911 voice/data network adapted to receive the voice portion and data portion of the 911 emergency call; and
an automatic location identification database in communication with the 911 voice/data network storing location information relating caller devices to the appropriate emergency service organization;
wherein the 911 voice/data network determines the appropriate emergency service organization for the 911 emergency call by retrieving location information from the automatic location identification database associated with the caller device, wherein the appropriate emergency service organization is responsible for providing emergency service to the caller device based on the location of the caller device.

15. The 911 emergency voice/data telecommunication network as set forth in claim 14, the appropriate emergency service organization including:
a public safety answering point responsible for providing emergency service to the caller device based on the location of the caller device and including a 911 operator station adapted to receive at least one of the voice portion and data portion of the 911 emergency call; and
at least one of a law enforcement station, a fire department station, an emergency medical service station, a law enforcement mobile unit, a fire department mobile unit, an emergency medical service mobile unit, a military emergency response organization, and a military mobile unit wherein each station and each mobile unit is adapted to receive the voice portion and data portion of the 911 emergency call;
wherein the 911 operator station dispatches the voice portion and data portion of the 911 emergency call to at least one of the law enforcement station, fire department station, emergency medical service station, law enforcement mobile unit, fire department mobile unit, emergency medical service mobile unit, military emergency response organization, or military mobile unit based on interpretation of an emergency situation associated with the 911 emergency call.

16. A 911 emergency voice/data telecommunication network, including:
a base station adapted to receive a 911 emergency call originated by a mobile station, the 911 emergency call having a voice portion and a data portion, wherein the mobile station captures sound and image information from the vicinity of the caller device and communicates the captured sound and image information in the 911 emergency call, at least part of the captured sound and image information being communicated in the data portion of the 911 emergency call;

a mobile switching center in communication with the base station and adapted to receive the 911 emergency call and separately route the voice portion and the data portion through the 911 emergency voice/data telecommunication network to an appropriate emergency service organization;

a mobile positioning center in communication with the mobile switching center and adapted to receive a 911 emergency call origination request associated with the 911 emergency call from the mobile switching center, determine an appropriate public safety access point in an emergency services network for receiving the 911 emergency call, and communicate the appropriate public safety access point for receiving the 911 emergency call to the mobile switching center; and a position determining entity in communication with the mobile positioning center and the mobile switching center adapted to receive a geographic position request from the mobile positioning center associated with the 911 emergency call and, in response to the geographic position request, initiating a position determining process to determine a location of the mobile station that originated the 911 emergency call.

17. The 911 emergency voice/data telecommunication network as set forth in claim 16 wherein origination of the 911 emergency call from the mobile station includes communication of an origination request message to the mobile switching center through the base station, the origination request message specifying a 911 emergency call service option.

18. The 911 emergency voice/data telecommunication network as set forth in claim 17 wherein at least one of the base station, mobile switching center, mobile positioning center, and positioning determining entity respond to the 911 emergency call service option by allocating resources to the 911 emergency call with priority over non-emergency calls.

19. The 911 emergency voice/data telecommunication network as set forth in claim 16 wherein the mobile station adds a timestamp to the captured sound and image information communicated in the 911 emergency call.

20. The 911 emergency voice/data telecommunication network as set forth in claim 16 wherein the mobile switching center adds a timestamp to the captured sound and image information communicated in the 911 emergency call.

21. The 911 emergency voice/data telecommunication network as set forth in claim 16, the mobile switching center including:
a base station communication interface in communication with the base station and adapted to receive the voice portion and data portion of the 911 emergency call;
a voice channel in communication with the base station communication interface and adapted to receive the voice portion of the 911 emergency call;
a data channel in communication with the base station communication interface and adapted to receive the data portion of the 911 emergency call; and
a network communication interface in communication with the voice channel and the data channel and adapted to receive the voice portion of the 911 emergency call from the voice channel and the data portion of the 911 emergency call from the data channel; and
a 911 voice/data origination control process in communication with the base station communication interface, voice channel, data channel, and network communication interface to control routing of the 911 emergency call to the appropriate emergency service organization.

22. The 911 emergency voice/data telecommunication network as set forth in claim 21 wherein the data channel is compatible with PPP/IP communication protocol.

23. The 911 emergency voice/data telecommunication network as set forth in claim 16 wherein the mobile switching center separately routes the voice portion and data portion of the 911 emergency call to the appropriate public safety access point based at least in part on the location of the mobile station that originated the 911 emergency call.

24. The 911 emergency voice/data telecommunication network as set forth in claim 23 wherein the appropriate public safety access point is responsible for providing emergency service to the mobile station based on the location of the mobile station.

25. The 911 emergency voice/data telecommunication network as set forth in claim 23 wherein the appropriate public safety answering point includes a 911 operator station adapted to receive the voice portion and data portion of the 911 emergency call and the emergency service network further includes at least one of a law enforcement station, a fire department station, an emergency medical service station, a law enforcement mobile unit, a fire department mobile unit, and an emergency medical service mobile unit wherein each station and each mobile unit is adapted to receive the voice portion and data portion of the 911 emergency call, wherein the 911 operator station dispatches the voice portion and data portion of the 911 emergency call to at least one of a law enforcement station, a fire department station, an emergency medical service station, a law enforcement mobile unit, a fire department mobile unit, or an emergency medical service mobile unit based on interpretation of emergency situation associated with the 911 emergency call.

26. A method for communicating a mobile-originated 911 emergency call to an appropriate public safety answering point, the method including the steps:
a) receiving a first origination request message for the 911 emergency call from a mobile station at a mobile switching center via a base station serving the mobile station, the 911 emergency call including sound and image information from the vicinity of the mobile station;
b) communicating a second origination request message for the 911 emergency call from the mobile switching center to a mobile positioning center;
c) communicating a geographic position request message from the mobile positioning center to a position determining entity;
d) determining a location of the mobile station that originated the 911 emergency call at the positioning determining entity;
e) communicating the location of the mobile station that originated the 911 emergency call from the positioning determining entity to the mobile positioning center in a geographic position return result message;
f) determining the appropriate public safety answering point for receiving the 911 emergency call at the mobile positioning center from the location of the mobile station that originated the 911 emergency call;
g) communicating routing information for the appropriate public safety answering point from the mobile positioning center to the mobile switching center in a return result message in response to the second origination request message; and h) separately routing a voice portion and a data portion of the 911 emergency call to the appropriate public safety answering point.

27. The method set forth in claim 26 wherein the sound information is communicated in the data portion of the 911 emergency call.

28. The method as set forth in claim 26 wherein the image information includes at least one of a still frame image, a sequence of still frame images, or motion video.

29. The method as set forth in claim 28 wherein the image information is communicated in the data portion of the 911 emergency call.

30. The method as set forth in claim 26, wherein the first origination request message includes a 911 emergency call service option.

31. The method as set forth in claim 30 wherein the base station and mobile switching center respond to the 911 emergency call service option by allocating resources to the 911 emergency call with priority over non-emergency calls.

32. The method as set forth in claim 26 wherein the mobile station or other equipment in the communication system adds a timestamp to the sound and image information communicated in the 911 emergency call.

33. The method as set forth in claim 26 wherein the mobile switching center adds a timestamp to the sound and image information communicated in the 911 emergency call.

34. The method as set forth in claim 26 wherein the first determining step (step d)) includes exchange of a series of messages between the positioning determining entity and the mobile station that originated the 911 emergency call.

35. The method as set forth in claim 26 wherein the second determining step (step f)) includes retrieving the routing information for the appropriate public safety access point from a database associated with the mobile positioning center based on the location of the mobile station that originated the 911 emergency call.

36. The method as set forth in claim 26 wherein the routing information communicated in step g) includes the routing information for the voice portion of the 911 emergency call and a static IP address for the data portion of the 911 emergency call.

37. The method as set forth in claim 36 wherein the voice portion of the 911 emergency call is routed to the PSAP and the data portion of the 911 emergency call is routed to the static IP address in step h).

* * * * *